W. F. HELMOND.
TYPEWRITING MACHINE.
APPLICATION FILED APR. 24, 1919.
1,399,481.
Patented Dec. 6, 1921.
2 SHEETS—SHEET 1.
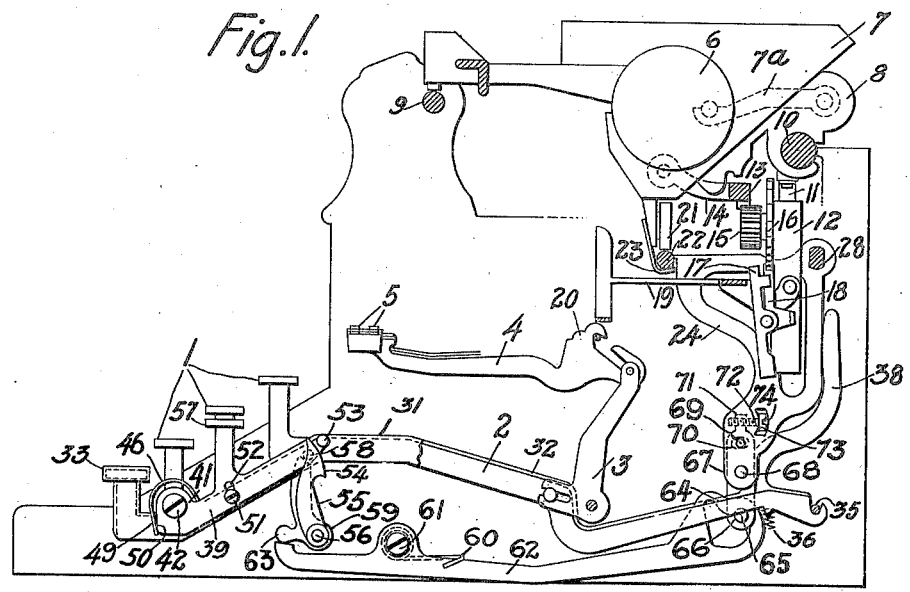
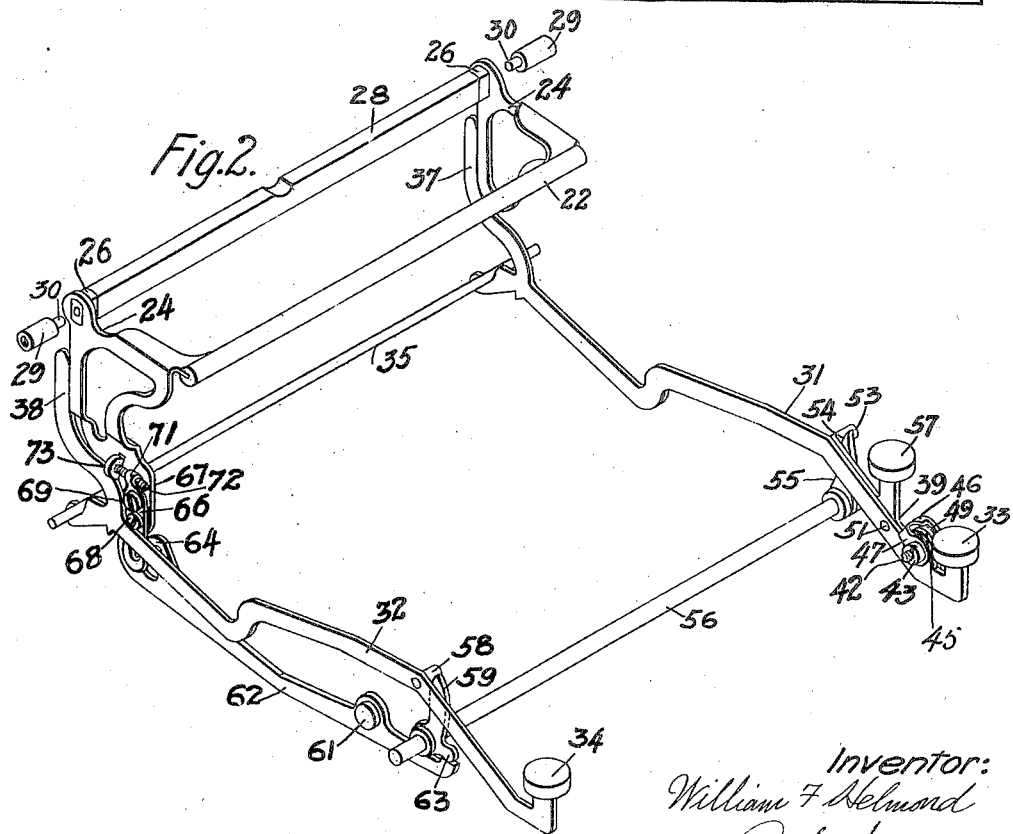
Inventor:
William F. Helmond
by C. C. Stickney
Attorney.

W. F. HELMOND.
TYPEWRITING MACHINE.
APPLICATION FILED APR. 24, 1919.
1,399,481.
Patented Dec. 6, 1921.
2 SHEETS—SHEET 2.
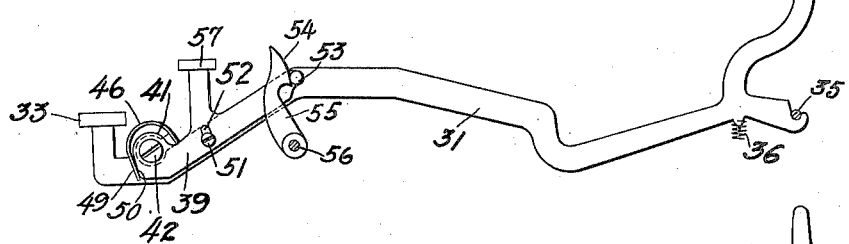
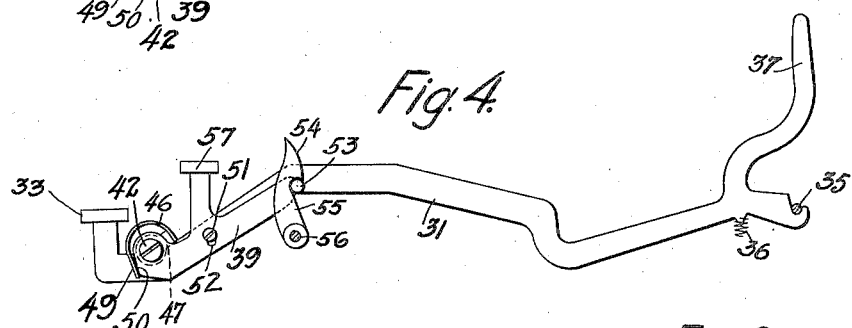
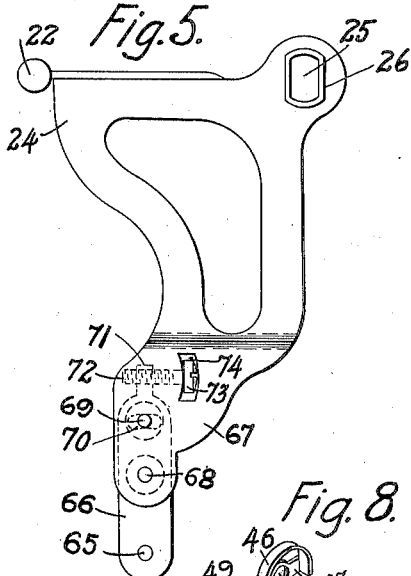
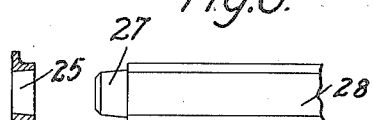
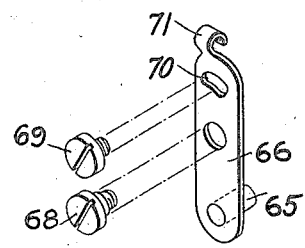
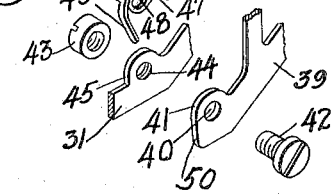
Inventor.
William F Helmond
by B C Stickney
Attorney.

UNITED STATES PATENT OFFICE.

WILLIAM F. HELMOND, OF HARTFORD, CONNECTICUT, ASSIGNOR TO UNDERWOOD TYPEWRITER COMPANY, OF NEW YORK, N. Y., A CORPORATION OF DELAWARE.

TYPEWRITING-MACHINE.

1,399,481.    Specification of Letters Patent.    Patented Dec. 6, 1921.

Application filed April 24, 1919. Serial No. 292,270.

*To all whom it may concern:*

Be it known that I, WILLIAM F. HELMOND, a citizen of the United States, residing in Hartford, in the county of Hartford and State of Connecticut, have invented certain new and useful Improvements in Typewriting-Machines, of which the following is a specification.

This invention relates to typewriting machines, and more particularly to case-shift mechanism.

The main object of this invention is to provide an improved case-shift mechanism and improved locking means therefor.

The invention is herein illustrated as applied to an Underwood typewriting machine. The shift frame may be actuated by two temporary shift levers, and one of these, preferably at the right of the machine, may be locked in depressed position. To this end, an auxiliary key lever is pivoted at its forward end on the shift lever and connected thereto, so as to have a limited movement thereon. The free end of the auxiliary lever is normally held in raised position by a spring device secured in position by means of the pivot for the auxiliary lever. Due to the normally raised position of the rear end of the auxiliary lever, a pin or keeper positioned at that point will, upon depression of the shift lever by means of the shift key, cam back a hooked-latch, but will not be depressed sufficiently to be locked by said latch. Upon depression, however, of the shift-lock key mounted on the auxiliary lever, the pin will be depressed relatively to the shift lever until the auxiliary lever reaches the lower limit of its movement on the shift lever, and then, as the shift lever is depressed by further movement of the key, the pin will be carried to a position to be engaged by the hooked-latch. The auxiliary lever is of simple construction and the spring device is so constructed that the parts are readily assembled.

It will be seen that release of the right-hand shift lever may be effected by the left-hand shift lever.

At the left side of the machine, provision is made of means for locking the platen in upper and lower-case positions. This means is rendered ineffective upon depression of either of the shift keys. For the purpose of such locking, a pivoted lever is provided with a locking cam having two depressions to receive a pin carried by the left-hand bracket of the shift frame. It is desirable to have the position of the left-hand bracket, when locked in raised position, correspond with that of the right-hand bracket, due to the locking of the right-hand shift lever in depressed position. Heretofore, the desired result has been obtained by adjusting the locking cam with reference to the locking lever. The connections between the lever and the cam were such, however, that the machine had to be tipped up, and even then difficulty was experienced in getting the proper adjustment, since there was no guide to assist in determining the position of the parts. It was necessary to try one adjustment and then another until a satisfactory result was obtained. In the present embodiment, the locking cam is fixed on the locking lever, and provision is made for adjustment of the pin on the end frame or bracket of the shift frame. To this end, the pin may be mounted on a lever pivoted on a downward extension of the bracket, and provision made of a clamping screw to secure the lever in adjusted position, and a screw device connected with the lever for adjusting the position of the same on the bracket. It will be seen that the parts are so arranged that the adjusting and retaining devices are accessible from the outside of the machine when the machine is in normal upright position.

In order to adapt the shift frame for use with the other features of the invention, the left-hand bracket or end frame may be provided with a downward extension, slightly offset, so as to avoid interference with the corresponding shift lever. For the purpose of insuring proper relative positioning of the brackets on the rock shaft, the brackets may be provided with oval or oblong openings having flanges thereabout formed preferably by drawing the metal into the desired shape. The ends of the shift frame shaft are shaped to fit in the openings and in the collars formed by said flanges, and may be reduced slightly at their ends to facilitate the assembly of the parts. The brackets may be secured in position on the shaft by any suitable means, preferably by soldering. Heretofore, it has been customary to braze a bushing in place on each side frame or bracket, and to use pins to secure a satisfactory connection between the brackets and the shaft for supporting the shift frame.

Other features and advantages will hereinafter appear.

In the accompanying drawings,

Figure 1 is a diagrammatic side elevation, partly in section, of an Underwood typewriting machine, with my invention applied thereto.

Fig. 2 is a skeleton perspective view, showing the shift frame, the shift keys, and the locking devices.

Fig. 3 is a side view of the right-hand shift lever, showing the position taken by the parts when the lever is depressed by means of the key at its extremity.

Fig. 4 is a view similar to Fig. 3, but showing the shift lever locked in depressed position as a result of its depression by means of a key pivotally mounted on a right-hand shift lever.

Fig. 5 is a view of the left-hand bracket, forming part of the shift frame.

Fig. 6 is an edge view, partly in section, of the bracket shown in Fig. 5, and also shows an end of the bar by which the brackets are connected.

Fig. 7 is a perspective view of parts of the invention removed from the bracket.

Fig. 8 is a fragmentary perspective view of the parts adjacent the point where the auxiliary lever is supported on the right-hand shift lever.

Upon depression of character keys 1, key levers 2 will act through bell-cranks 3 to swing type-bars 4, upwardly and rearwardly, to bring types 5 into printing contact with the platen 6, rotatably supported in a platen frame 7, which is mounted for vertical movement and is guided in such movements by arms 7ª, carried by a rock shaft mounted in the carriage 8.

Said carriage 8 is mounted for sliding movement on rails or rods 9 and 10, and is urged in one direction by means of the usual strap 11 and spring drum 12. The movement of the carriage under the urging of the strap and spring drum is controlled by the usual escapement mechanism. For such control, a rack 13 mounted on arms 14, pivoted on the carriage, engages with a pinion 15, having the usual one-way driving connection with an escapement wheel 16, which, in turn, is controlled by the usual fast and loose dogs 17 and 18. To effect movement of said dogs, provision is made of a universal frame 19, which, at the termination of the printing stroke of a type bar, is engaged by a heel 20 and forced to the rear against the action of a spring, not shown, which tends to return both the universal frame and the dogs to forward position. All of the mechanism so far described is well known in the Underwood typewriting machines.

For the purpose of shifting the platen to upper and lower-case positions, use is made of the usual structure in which a roller 21, secured to the platen frame, rests on a shift rail 22 carried by brackets or side frames 24, and a hook 23 is used to prevent jumping of the platen frame with reference to the shift rail. Hitherto it has been customary to provide the brackets with circular openings and bushings brazed in position to receive a rock shaft of circular cross-section, by which the shift frame was supported for swinging movement and it was necessary to pin the brackets in position on the shaft. In the present construction, provision is made of oblong or oval openings 25 and collars 26 of the same general shape, formed preferably by drawing the metal into the desired shape. Said openings and collars are fitted over reduced ends 27 of a bar 28 of general oblong or oval form, which takes the place of the ordinary rock shaft. By this construction, the brackets are held against turning on the bar, and the necessity of pinning them in position is obviated. The brackets are secured on bar 28 by any suitable means, preferably by soldering. In order to obtain suitable pivotal support for bar 28, provision is made of pintles 29 having reduced ends 30 inserted into suitable openings in the ends of said bar 28, the pintles being secured in fixed portions of the frame in any desired manner. It will be evident that the work of assembling the parts of the shift frame is very much simplified and facilitated as a result of constructing the brackets 24 and the bar 28 as just described.

Shift levers 31 and 32 are mounted at the sides of the machine and provided with shift keys 33 and 34, respectively, at opposite sides of the keyboard. The shift levers are mounted on the shaft 35, which is also common to the character key levers, and the shift keys are held in raised positions by springs 36 of the same kind as those used in connection with the character key levers. In order to transmit movement to the shift frame, shift levers 31 and 32 are provided with upward extensions 37 and 38, which normally contact with the corresponding brackets of the shift frame. For the purpose of retaining the shift frame in upper-case position, the right-hand shift lever 31 is provided with an auxiliary lever 39, the forward end of which is provided with an opening 40 in an upwardly-extending ear 41. Said auxiliary lever is pivotally connected with said shift lever 31 by means of a headed screw 42 and a nut 43, the screw 42 extending through an opening 44 in an ear 45 projecting from said shift lever 31.

In order to normally urge the auxiliary lever 39, in one direction, provision is made of a spring member 46 comprising a main portion curved to extend over ears 41 and 45, an ear 47 offset from said main portion and provided with an opening 48 adapted to receive screw 42, and a spring extension 49. These parts are assembled and screw 42 inserted through openings 40, 44 and 48, the screw being secured in position by said nut 43. When assembled, one end of member 46 engages the upper edge of shift lever 31, the extension 49 engages surface 50 of the auxiliary lever at a point offset from the pivotal support of the auxiliary lever. Movement of the auxiliary lever 39 with reference to shift lever 31 is limited by suitable means, such as a screw pin 51 supported in shift lever 31 and extending through a slot 52 in said auxiliary lever 39. At the rear end of said auxiliary lever 39, it is provided with a pin or keeper 53.

Upon depression of key 33, pin 53 will engage a cam 54 on a latch member 55 supported on a rock shaft 56, and swing said latch member forwardly. The position of pin 53 with reference to shift lever 31 is such, however, that the pin will not be depressed sufficiently to release latch member 55 to permit a locking action. If, however, key 57 on the auxiliary lever 39 is depressed, the auxiliary lever will be swung about its pivot until the upper end of slot 52 engages screw 51 and the shift lever 31 will then be depressed by further movement of said key 57. Due to the changed position of the pin 53 with reference to shift lever 31, the pin will be carried past the cam surface 54, and will permit latch member 55 to swing to the rear and lock the pin 53, and consequently shift lever 31 in depressed position.

The release of pin 53 from locking engagement with latch member 55 may be effected by depressing the left-hand shift key 34, the result of such a depression causing a pin 58 on shift lever 32 to engage a cam surface on the rear side of an arm or plate 59, fixed on shaft 56, and causing a rocking of said shaft to move latch member 55 sufficiently to release said pin 53. The shaft 56 is urged to normal position by means of a spring 60 coiled about the pivot 61 of lever 62, which engages at its forward end with a forwardly-projecting arm 63 formed integrally with arm 59.

Said lever 62 forms part of a locking means for holding the shift frame in lower and upper-case positions, and to that end is provided with a locking cam 64 preferably integral with said lever 62, said cam being provided with a rearward notch or depression to engage a pin 65 carried by the corresponding bracket 24 for locking the shift frame in lower-case position, and a forward notch or depression for locking the same in upper-case position. It will be seen that depression of key 33 or key 34 will rock shaft 56 and concomitantly elevate the locking cam 64 to release pin 65 and that engagement of pin 65 will be effected only when latch 55 has moved into locking engagement with pin 53. In other words, locking of the left-hand bracket in upper-case position will be effected only when shift lever 31 is locked in depressed position.

In order to lock the left-hand bracket in an upper-case position, corresponding to the upper-case position assumed by the right-hand bracket, due to the depression of key 33, it has been found desirable to provide suitable adjusting means. Hitherto the desired result has been obtained by adjusting the locking cam with reference to the lever, but when the adjustment was effected in this way, it was found necessary to tip up the machine in order to obtain proper adjustment of the parts, and to obtain such asjustments by successive trials, since no guide was furnished for accurate positioning.

In the present construction, the adjustment is effected by means for shifting the position of pin 65 relative to the left-hand shift frame 24, by which it is carried. For this purpose, the pin 65 is mounted on a plate or lever 66 pivoted on a downward extension 67 of left-hand bracket 24 by means of a screw 68, the plate 66 and pin 65 thus constituting an interponent through which the engagement between the shift frame and the locking lever 62 may be effected. It will be seen that extension 67 is offset with respect to its bracket to obviate any interference with the actuation of the left-hand bracket 24 by means of upward extension 38 of shift lever 32. For the purpose of securing said lever 66 in adjusted position, a screw 69 is inserted through a slot 70 in said lever 66 and secured in said downward extension 67. It will be seen that the pin-and-slot connection, just described, limits the pivotal movement of said lever 66 about screw 68. In order to provide an adjusting means for positioning said lever 66, before it is secured in position by screw 69, the upper end 71 of the lever is curved over to engage a shank of an adjusting screw 72, and said upper end 71 is threaded, so as to provide proper threaded engagement with the threaded shank of the adjusting screw. In order to prevent substantial longitudinal movement of the adjusting screw 72, its head 73 projects through a slot 74 in a downward extension of the shift frame bracket, the slot being of such conformation as to enable movement of the screw 72 in a vertical plane to enable the screw to be kept in proper position relative to the upper end 71 of lever 66. It will be seen that clamping screw 69 is readily accessible from the left side of the machine, and that adjusting screw 72 is readily accessible from the rear of the machine. The arrangement just described makes it possible to adjust the locking means at the left side of the shift frame without moving the machine from its normal upright position.

Variations may be resorted to within the scope of the invention, and portions of the improvements may be used without others.

Having thus described my invention, I claim:

1. In a typewriting machine, the combination with a shiftable platen, of means, including a shift frame, for moving said platen, a shift lever for actuating said shift frame, means for locking said shift frame in either upper or lower-case position including a pin connected with said shift frame to move therewith, and means to adjust said pin with reference to said shift frame, and thereby determine the upper and lower-case positions assumed by the shift frame, said adjusting means being accessible from the outside of the machine when the same is in normal upright position.

2. In a typewriter, a case-shift mechanism comprising, in combination, a shift-frame element, means to shift said frame element, a locking element to engage and lock said frame element when in either of two case-determinative positions, an adjustable interponent being provided through which locking engagement between said elements may be effected, said adjustable interponent affording means for varying the case-determinative positions of said frame element, and means accessible from the exterior of said typewriter, when assembled and in upright position, for effecting and maintaining the adjustment of said interponent.

3. In a typewriter, a case-shift mechanism comprising, in combination, a shift-frame, means to shift said frame, a locking member to engage and lock said frame when in either of two case-determinative positions, said frame having an adjustable interponent through which its locking engagement with said locking member may be effected, said adjustable interponent affording means for varying the case-determinative positions of said frame, and means accessible from the exterior of said typewriter, when assembled and in upright position, for effecting and maintaining the adjustment of said interponent.

4. In a typewriting machine, the combination with a shiftable platen, of a shift frame comprising end brackets, a member pivoted on one of said brackets, a projection on said member, means to adjust the position of said member and consequently said projection with reference to the bracket, means to secure said member in adjusted position, and a pivoted lever provided with recesses to receive said projection when said shift frame is in upper or lower-case positions, respectively.

5. In a typewriter, a case-shift mechanism comprising, in combination, a shift-frame element, means to shift said frame element, a locking element to engage and lock said frame element when in either of two case-determinative positions, an adjustable interponent through which locking engagement between said elements may be effected, said adjustable interponent affording means for varying the case-determinative positions of said frame element, means accessible from the rear of said typewriter, when assembled and standing upright, for effecting an adjustment of said interponent, and means accessible from one side of said typewriter, when assembled and standing upright, for clamping said interponent in its adjusted position.

6. In a typewriter, a case-shift mechanism comprising, in combination, a shift-frame, means to shift said frame, a locking member to engage and lock said frame when in either of two case-determinative positions, said frame having an adjustable interponent through which its locking engagement with said locking member may be effected, said adjustable interponent affording means for varying the case-determinative positions of said frame, means accessible from the rear of said typewriter, when assembled and standing upright, for effecting an adjustment of said interponent, and means accessible from one side of said typewriter, when assembled and standing upright, for clamping said interponent in its adjusted position.

7. In a typewriting machine, the combination with a platen, of means for shifting said platen to different case positions, including a shift frame, a shift lever engaging said shift frame at one side of the machine, a device for locking said shift lever in depressed position, means, including a part carried by said shift frame and a coöperating part, controlled by said shift-lever-locking device, for locking said shift frame in position when said shift lever is in depressed position, and means, accessible from the outside of the machine, when said machine is in normal upright position, for adjusting the relation between parts of said shift-frame-locking means, to accord with the position of the shift frame determined by the shift lever when locked in depressed position.

8. In a typewriting machine, the combination with a shiftable platen, of a shift frame, locking means for said shift frame, comprising a lever, coöperating devices whereby said lever may be connected with said shift frame to lock the same in position, comprising a portion of said lever provided with two recesses, a portion of said shift frame adapted to engage in said recesses, and means accessible from the outside of the machine, when the machine is in normal upright position, for effecting relative adjustment of said coöperating devices and securing the same in adjusted position.

9. In a typewriting machine, the combination with a shiftable platen, of a shift frame therefor, means to lock said shift frame in upper and lower-case positions, comprising a member adjustable on said shift frame, a lever having two recesses adapted to engage said member in accordance with the position of said shift frame, means for adjusting said member on said shift frame, and means for securing said member in adjusted position on said shift frame, said adjusting means and said securing means being accessible from the outside of the machine when the same is in its normal upright position.

10. In a typewriting machine, case-shift mechanism comprising, in combination, a shift-lever, a shift-key to actuate said lever, a pin associated with said lever so as to have limited movement upward and downward with respect thereto, means yieldingly holding said pin in raised position with reference to said lever, and a latch member yieldably held in its normal position, said latch member having a downwardly-facing shoulder and a cam thereabove, the position of the latter being such that depression of the shift-key and consequent depression of the shift-lever will carry said pin into engagement with said cam to shift the latch member and maintain it in shifted position until the shift-key is released, and depression of the pin will cause the same to be moved downwardly with respect to the shift-lever until it reaches its limiting position with respect thereto and then will move said shift-lever to its lowest position, thereby causing the pin to actuate the cam and ride off the lower end thereof to release the latch member so that the shoulder thereof will engage the pin on its upper side.

11. In a typewriting machine, case-shift mechanism comprising, in combination, a shift-lever, a shift-key for actuating the same, a device, comprising a key and a pin, mounted on said shift-lever so that the pin may have limited upward and downward movement with respect to the shift-lever, yielding means to normally hold said pin in its upper position with reference to the shift-lever, and a latch member yieldably held in its normal position, said latch member having a downwardly-facing shoulder and a cam thereabove, the position of the latter being such that depression of the shift-key will carry said pin along the cam to shift the latch member and maintain it in shifted position when the shift-key is in depressed position, and depression of the key of said device will depress the pin with reference to the shift-lever and then depress the shift-lever so that, when the shift-lever is fully depressed, the pin, after shifting said latch member by means of its cam, will ride off the lower part of the cam and permit the shoulder of the latch member to move into locking position above the pin to hold the shift-lever in depressed position.

12. In a typewriting machine, the combination with a primary lever and a key thereon, of means for yieldingly holding the same in normal position, a secondary lever pivoted at one end on said primary lever, and having limited movement thereon, a key on said secondary lever, a pin at the free end of said secondary lever, means to limit the movement of said secondary lever on said primary lever, and a spring device acting on the pivoted end of said secondary lever to hold said pin in raised position, said spring device being held in position by the pivotal mounting of said secondary lever.

13. In a typewriting machine, case-shift mechanism comprising, in combination, a shift-lever, a shift-key thereon, a secondary lever pivoted at one end on said shift-lever and having limited movement thereon, a projection at the free end of said secondary lever, a spring device acting on said secondary lever to hold said projection in raised position with reference to the shift-lever, a key on said secondary lever whereby the projection may be depressed with respect to the shift-lever and the latter then depressed, and a latch member yieldably held in its normal position, said latch member having a downwardly-facing shoulder and a cam thereabove, the position of the latter being such that depression of the shift-key will carry said projection along said cam to shift the latch member and maintain it in shifted position, and depression of the key on the secondary lever will depress said projection with reference to the shift-lever, so that, when the shift-lever is fully depressed, the projection, after shifting said latch member, will ride off the lower part of the cam and permit the shoulder of the latch member to engage the projection to lock the shift-lever in depressed position.

14. In a typewriting machine, case-shift mechanism comprising, in combination, a shift-lever, a shift-key thereon, a secondary lever pivoted at its front end on said shift-lever and having limited movement thereon, a projection at the rear end of said secondary lever, a spring device acting on said secondary lever to hold said projection in raised position with reference to the shift-lever, a key on the secondary lever intermediate the pivot thereof and said projection, a pivoted latch having a downwardly-facing shoulder and a cam above said shoulder, and spring means for maintaining the latch in its normal position so that said cam will be in the path of said projection, complete depression of the shift-lever by its key carrying said projection to the lower end of said cam, thereby shifting the latch from its normal position, and complete depression of said shift-lever by the secondary lever key serving to lower said projection with reference to the shift-lever so that, in completing depression of the latter, the projection will be carried along said cam to actuate the same and off the lower end thereof to permit said shoulder to pass above the projection and lock the shift-key in depressed position.

15. A shift frame for typewriting machines comprising end frames, each having an oblong tapering opening therethrough, and comprising a projecting collar forming an extension of the walls of said opening, a bar having tapered reduced ends shaped to fit into said collars and openings, a pintle connected with said bar at each end, and a shift rail secured to said end frames.

16. A shift frame for typewrietrs having provisions for locking the platen in upper and lower-case positions, comprising end frames, a member pivoted on one of said end frames and provided with an arcuate slot concentric with the pivot of said member, a clamping device for said member connected with the end frame through said slot, a screw for adjusting said member, having operative connection with said member and with the end frame, and a projection on said member, by means of which the shift frame may be locked in upper or lower-case position.

17. A shift frame for typewriters having provisions for locking the platen in upper and lower-case positions, comprising end frames, a member pivoted on one of said end frames, and provided with a portion by means of which the shift frame may be locked in upper or lower-case position, and means for adjusting said member on the corresponding end frame, comprising a screw having a shank in threaded engagement with said member and a head extending into a slot formed in the corresponding end frame.

18. In a typewriting machine, case-shift mechanism comprising, in combination, a shift-lever, a shift-key for actuating the same, a device, comprising a key and a locking member, mounted on said shift-lever so that the locking member may have limited upward and downward movement with respect to the shift-lever, yielding means normally holding said locking member in its upper position with reference to the shift-lever, a second locking member adapted to effect locking engagement with the first-mentioned locking member, and yieldable means normally holding the second locking member in the path of the first, the locking members being so shaped that, upon depression of the shift-key, the first-mentioned locking member will engage the second locking member and force the same back from its normal position and release the latter when the shift-key is released, and that, upon depression of the key of said device, the first-mentioned locking member will be depressed with respect to the shift-lever, and the shift-lever then depressed so that, during movement of the latter to its lowest position, the first-mentioned locking member will force the second locking member out of its normal position and then release the same so that locking engagement may be effected therebetween and the shift-lever locked in depressed position.

19. A typewriter case-shift mechanism comprising a shifting frame or device, a lock-lever or arm adjustably pivoted upon said device to engage key-actuated means for locking the shifting frame in either shift position, and motion-reducing means for effecting relatively fine adjustments whereby the positions in which said shifting frame is locked by said arm may be varied.

20. A typewriter case-shift mechanism comprising a shifting frame or device, a lock-lever or arm adjustably pivoted upon said device to engage key-actuated means for locking the shifting frame in either shift position, means for effecting relatively fine adjustment between said arm and said shifting frame, and means for maintaining said adjustment.

WILLIAM F. HELMOND.

Witnesses:
JOHN J. BASKERVILLE,
SHIRLEY E. GLEDHILL.